United States Patent
Pellin

(10) Patent No.: US 8,950,835 B2
(45) Date of Patent: Feb. 10, 2015

(54) METHOD TO REPLACE AN INSTRUMENT CASE AND REPLACEMENT CASE THEREFOR

(75) Inventor: Paul Pellin, Notre Dame de l'Île-Perrot (CA)

(73) Assignee: S & C Rail Solutions Inc., Brossard (CA)

( * ) Notice: Subject to any disclaimer, the term of this patent is extended or adjusted under 35 U.S.C. 154(b) by 600 days.

(21) Appl. No.: 13/102,787

(22) Filed: May 6, 2011

(65) Prior Publication Data

US 2011/0266174 A1 Nov. 3, 2011

Related U.S. Application Data

(63) Continuation of application No. PCT/CA2010/001539, filed on Sep. 27, 2010.

(51) Int. Cl.
*A47B 47/00* (2006.01)
*H02B 3/00* (2006.01)

(52) U.S. Cl.
CPC ..................... *H02B 3/00* (2013.01)
USPC ............... 312/352; 312/257.1; 52/745.01; 385/135; 246/1 R

(58) Field of Classification Search
USPC ............ 312/294, 352, 257.1, 100; 174/50; 385/134, 135; 206/305; 52/745.01; 246/1 R
See application file for complete search history.

(56) References Cited

U.S. PATENT DOCUMENTS

| 5,280,132 | A   | 1/1994  | Clarey et al. |
| 7,038,127 | B2* | 5/2006  | Harwood ................. 174/50 |
| 8,027,154 | B2* | 9/2011  | Gatti et al. ................ 361/645 |
| 2005/0275319 | A1* | 12/2005 | Wittmeier et al. .......... 312/100 |
| 2008/0080829 | A1* | 4/2008  | Smith et al. ................. 385/135 |

FOREIGN PATENT DOCUMENTS

| CN | 2657334 Y | 11/2004 |
| CN | 2790106 Y | 6/2006 |

* cited by examiner

*Primary Examiner* — James O Hansen
(74) *Attorney, Agent, or Firm* — Merchant & Gould P.C.

(57) ABSTRACT

A method designed to replace a compromised instrument case with a new case without the need to disconnect any wire, relay or any other electric equipment is described herein. The instrument panel is supported for example by a temporary support frame during the dismantling of the old case and the assembly of the new case. The new case is therefore assembled on site around the instrument panel. The new instrument case includes a floor which is made of at least two parts, one on each side of the wiring. The instrument case therefore remains in a normal working mode during the entire replacement procedure thus preventing downtime. As well, the amount of manpower required for the replacement of an instrument case is drastically reduced.

3 Claims, 14 Drawing Sheets

METHOD TO REPLACE AN INSTRUMENT CASE AND REPLACEMENT CASE THEREFOR

This application is a Continuation of PCT/CA2010/001539, filed 27 Sep. 2010, which claims benefit of Ser. No. 2,680,941, filed 29 Sep. 2009 in Canada and which applications are incorporated herein by reference. To the extent appropriate, a claim of priority is made to each of the above disclosed applications.

The present invention generally relates to instrument cases such as those used in the railroad industry. More specifically, the present invention is concerned with a method to replace such an instrument case and a replacement case therefor.

BACKGROUND

Railroad track electrical equipments are often located in cases and bungalows along the railroad track. These electrical equipments are primarily used to control rail traffic and crossing gates.

Many of these units were installed more than 50 years ago using either painted steel or galvanized metal. Over time, the environment has caused many of them to rust and corrode creating a potential safety hazard.

This compromised metal may allow insects, rodents, rain, and/or snow to penetrate the cases which can cause the electrical components to malfunction.

Some cases must also be replaced by bigger cases or bungalows to accommodate new, updated or additional equipments.

The current replacement procedure for the instrument cases in the railroad track industry is as follows:

1) The traffic on the track is slowed down or stopped;
2) All wiring, relays and other electrical components within the compromised instrument case are disconnected and removed;
3) The compromised instrument case is cut up and removed;
4) A new instrument case is installed on top of the new base;
5) The wiring, relays and other electrical equipment are reinstalled inside the new instrument case;
6) All the electrical connections are tested;
7) The old instrument case and components are discarded;
8) The track is re-opened for operation.

This procedure involves a tremendous labor cost, risks of misconnection and reduced track speed for a relatively long period of time.

SUMMARY

The method to replace an instrument case and replacement case therefor according to embodiments described herein are designed so that instrument cases can be replaced without the disconnection of any wire, relay or any other electric equipment. The instrument cases remain in operation during the entire replacement procedure thus preventing downtime, and, more specifically in the railroad industry, alleviating the need for train slowdown. As well, the amount of manpower is drastically reduced.

The method to replace an instrument case and replacement case therefor according to embodiments of the present invention are adaptable to any instrument case, cabinet or bungalow which uses one or multiple doors located on either side of the unit. It is also applicable to pole mount cabinets. More generally, the method to replace an instrument case according to illustrative embodiments of the present invention can be used to replace cases, cabinets or bungalows in many industries in addition to the railroad industry including, without limitations, the telecommunication industry and the energy distribution industry.

More specifically, in accordance with an embodiment of the present invention, there is provided a method for replacing an old instrument case with a new instrument case, the old instrument case including at least one instrument panel, the method comprising:

supporting each of the least one instrument panel;
removing the old instrument case;
installing the new instrument case and securing each of the at least one instrument panel thereto;
removing support from each of the at least one instrument panel.

According to another embodiment of the present invention, there is provided a new instrument case for replacing an old instrument case, the old instrument case including at least one instrument panel connected from outside the old instrument case through wiring, wherein the new instrument case comprising:

a peripheral wall including at least one opening; the peripheral wall having top and bottom ends;
at least one door, each to be movably mounted in a respective one of the at least one opening;
a roof for mounting to the peripheral wall at the top end thereof for closing the top end; and
a floor for mounting to the peripheral wall at the bottom end thereof for closing the bottom end;
the improvement wherein:
the floor being assembled from at least two sections and including at least one aperture for allowing passage to the wiring.

The expression "instrument panel" is to be construed herein as comprising any board, panel, sheet or support that includes electrical or electronic components or a combination thereof including without limitation circuitries, wirings, etc, used for any application including control, command, statistics, etc.

The expression "instrument case" is to be construed herein as including any case, casing, housing, bungalow, or any similar construction that includes an instrument panel.

Other objects, advantages and features of the present invention will become more apparent upon reading the following non restrictive description of embodiments thereof, given by way of example only with reference to the accompanying drawings.

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, non-recited elements or process steps.

The term "about" is used to indicate that a value includes an inherent variation of error for the device or the method being employed to determine the value.

Figure 1:
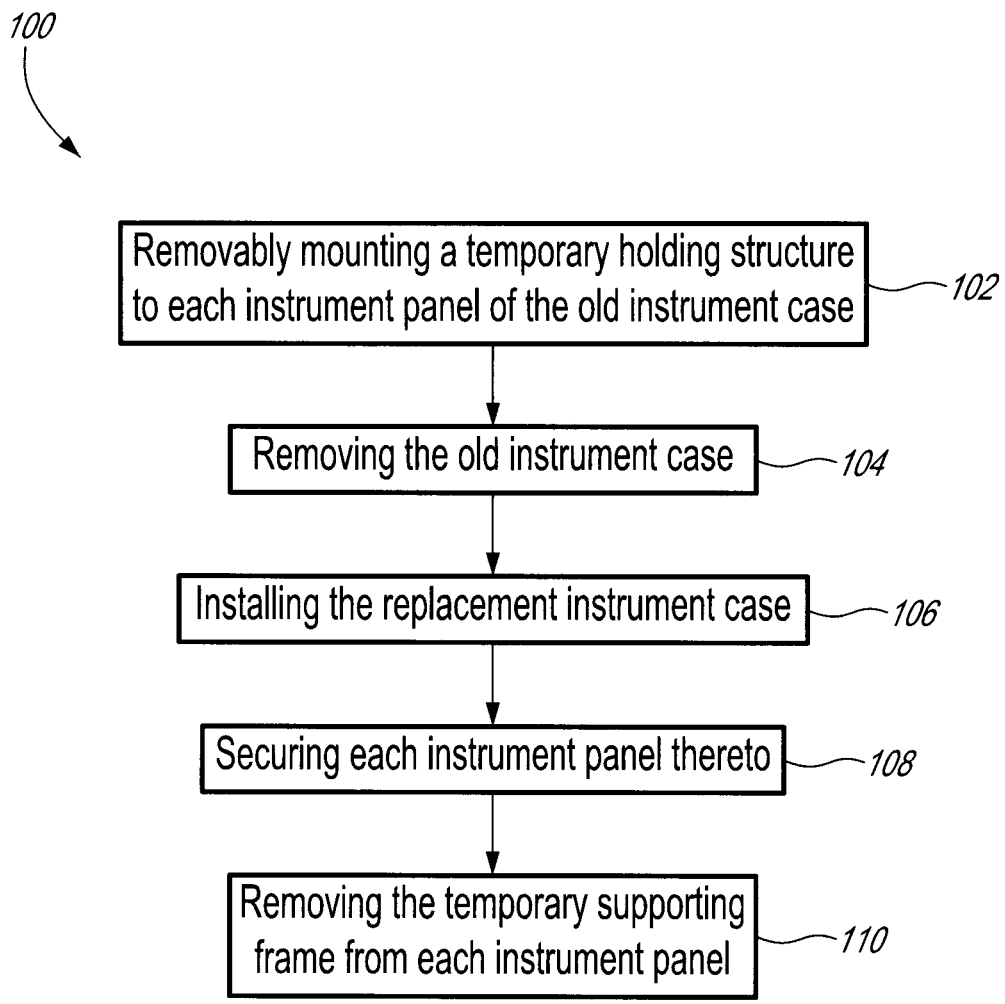
FIG. 1 is a flowchart of a method for replacing an old instrument case with a new instrument case.
Figure 11:
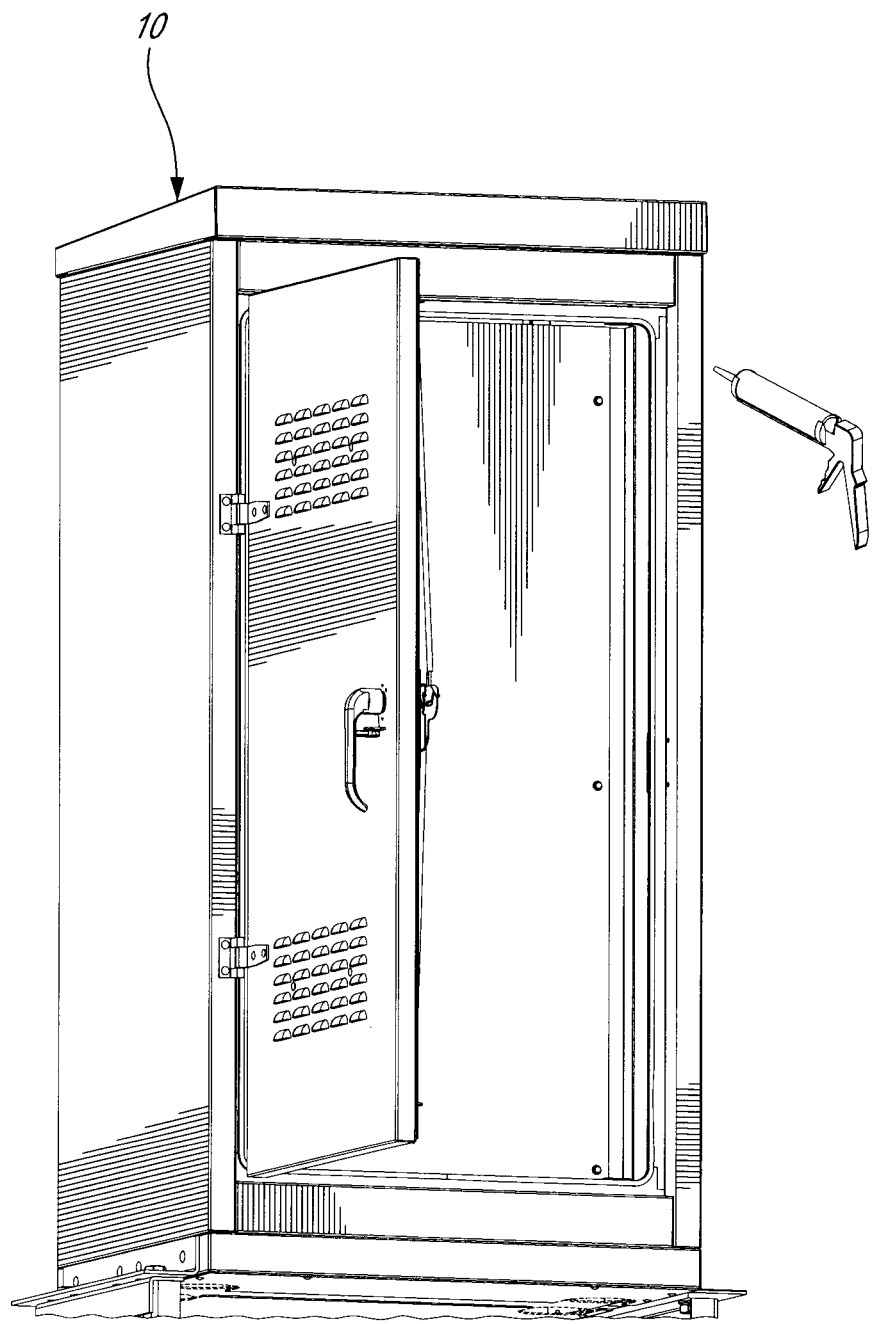
FIG. 11 is a perspective view of a replacement instrument case sealant being applied.

With reference to FIG. 1, a method 100 for replacing an old instrument case (not shown) with a new instrument case 10 (see FIG. 11) will now be described. The new instrument case 10 will also be referred to herein as the replacement case 10 or the new replacement case 10.

Figure 3:
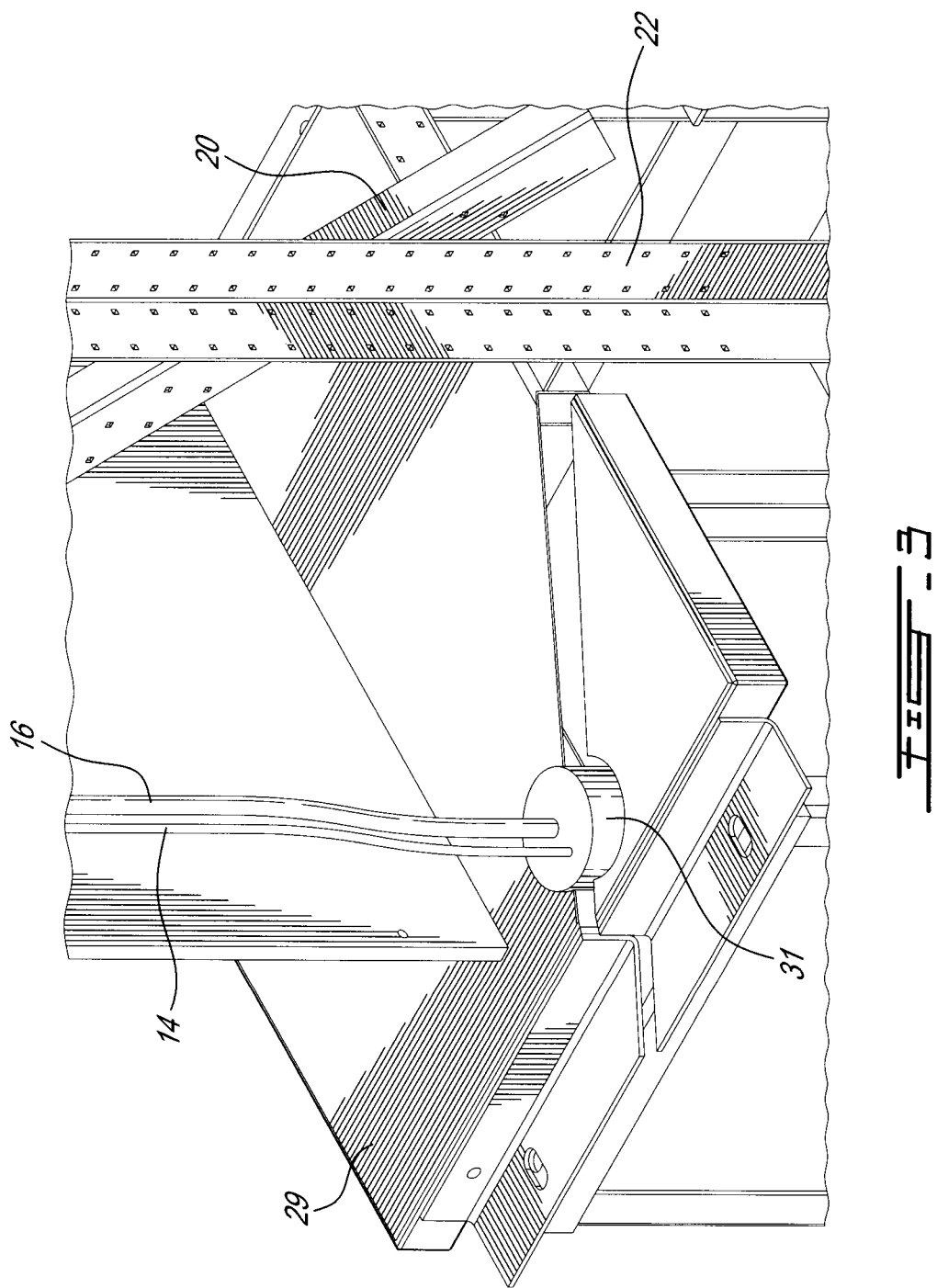
FIG. 3 is a perspective view of the floor of the old instrument case, illustrating the cutting of the floor on both sides of the wiring protective tube.

The old instrument case includes an instrument panel 12 that is part of one or more networks and that is connected thereto through wires 14 and 16 (see FIG. 3). Depending on the functions of the instrument panel 12, the wires 14 and 16 can be of the electric, optical, coaxial or power type or else. As will be described further in more detail, the method 100 allows the instrument panel 12 to remain in operation throughout the replacement of the old case with the new case 10, i.e. during steps 102 to 110.

It is to be noted that the configuration and nature of the wires 14 and 16 are provided for illustration purposes only and as an example and should not be used to limit the scope of the present invention.

In the first step 102, a temporary holding structure 18 is removably mounted to the instrument panel 12.

In cases where the old instrument case is provided with two or more instrument panels accessible through a corresponding number of doors on each side of the case, a temporary holding structure 18 is used for each instrument panel as will be described hereinbelow in more detail.

In step 104, the old instrument case is removed.

Many means and tools can be used to remove the old case, depending on its configuration, construction and on whether or not some parts thereof are to be recycled. The removing of the old case may include part or total dismantling or destruction thereof. Great care is given however to not disconnect the wires 14 and 16.

In step 106, the replacement case 10 is installed and, in step 108, the instrument panel 12 is secured thereto.

The temporary holding structure 18 can then be removed from the instrument panel 12.

Alternatively, in some application, the panel holding structure 18 is omitted and the instrument panel is supported for example by workers, adapted machinery or else.

Each of the steps 102 to 108 will now be described in more detail with references to FIGS. 2 to 11.

Prior to step 102, the front and back doors of the compromised instrument case are removed or at least open (not shown), any batteries are removed and placed on the side of the instrument case while leaving them connected.

The front and rear surfaces of the instrument panel 12 are thus exposed. It is to be noted that, for clarity purpose, the compromised instrument case is not illustrated in the appended figures. Also, the wires 14 and 16 connected thereto will be omitted on most figures, also for clarity purpose.

Once the instrument panel 12 is exposed, the panel holding structure 18 is installed (step 102).

Figure 2:
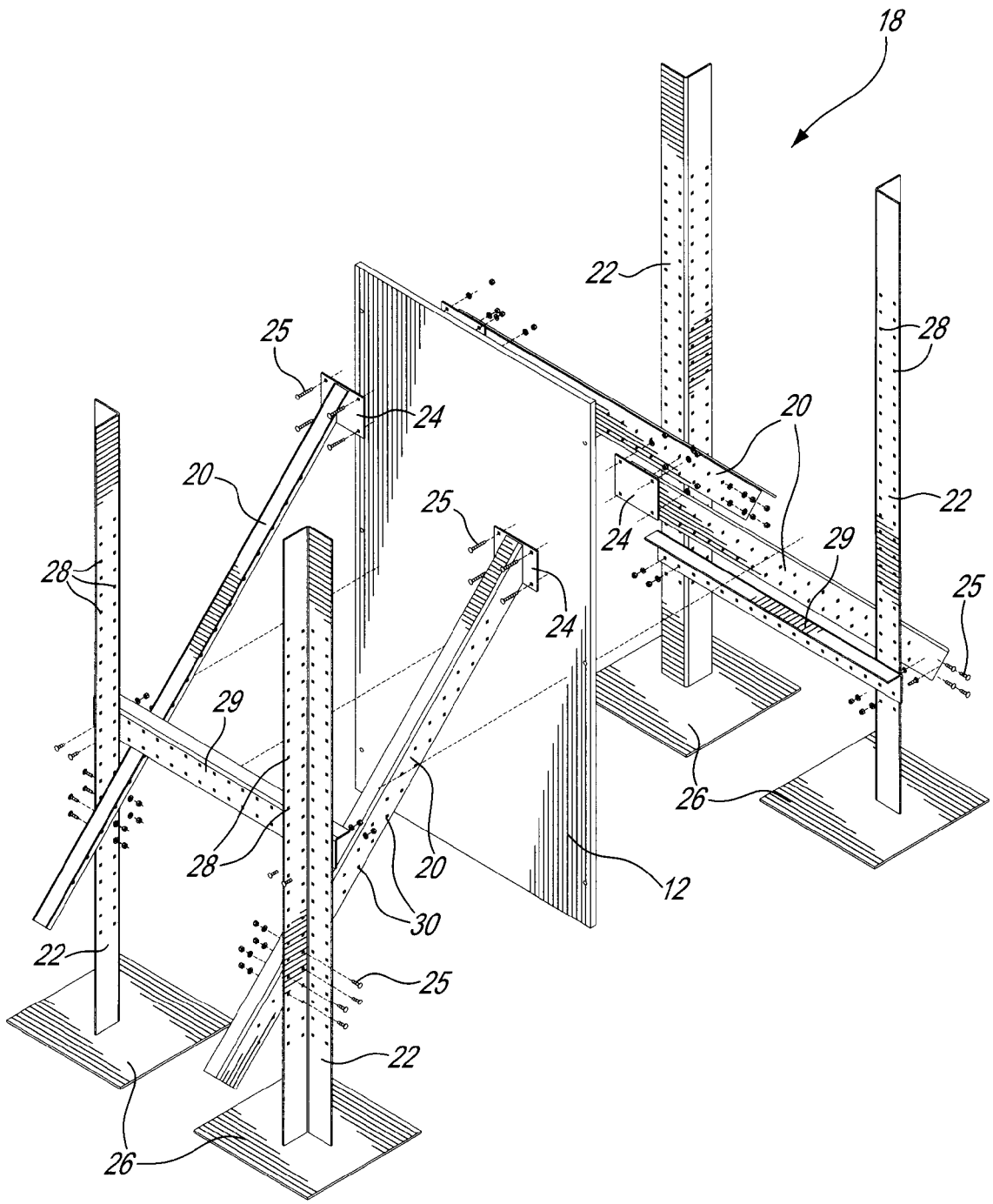
FIG. 2 is a perspective view of a temporary holding structure being mounted to the electric panel of an existing instrument case (not shown)

With reference to FIG. 2, the panel holding structure 18 includes four diagonal arms 20 for mounting to the instrument panel 12 and four upright legs 22, each for a receiving respective diagonal arm 20 and to be positioned on the ground. Each leg 22 includes a foot 26 in the form of a rectangular plate.

The instrument panel 12 receives the four diagonal arms 20 via respective brackets 24 secured to the diagonal arms 20 for example via welding. According to the illustrated embodiment, the brackets 24 of facing diagonal arms 20 are bolted together through the central panel 12.

According to the illustrated embodiment, the diagonal arms 20 and the legs 22 are made of angle-iron provided with a plurality of mounting holes 28 and 30 allowing the interconnection of the arms 20 to the legs 22 notwithstanding the height at which each arm 20 is mounted to the instrument panel 12. Fasteners 25 are used to mount the arms 20 to the legs 22. As will now appear obvious to a person skilled in the art, each arm 20 can be positioned at a different height relative to its respective leg 22 allowing stabilizing the panel 12 on an uneven ground.

Each pair of legs 22 on a same side of the panel 12 are interconnected by a respective cross-bar 29.

The configuration of the holding structure 18 is not limited to the embodiment illustrated in FIG. 2. For example, the diagonal arms 20 can be replaced by an L-shaped member. Other means can also be provided to adjustably assemble the frame members. Clamps, brackets, etc. or simply other fastening means may replace the fasteners. Also, the foot 26 can be replaced by a pile stake. The mounting position of the brackets 24 on the panel 12 may also be different than the one illustrated depending on the available space thereon. It is also not necessary that a pair of brackets 24 be positioned on opposite side faces of the panel 12 so as to face and be secured together.

The panel holding structure 18 is adapted to the configuration of the instrument case and more specifically to the number and configuration of the doors thereof. For example, two pairs of facing panel holding structures as shown in FIG. 2 can be used for instrument cases having four doors, i.e. two on each side, and two panels 12. If the instrument case includes a single door (not shown), a holding structure wherein the lower end of the instrument panel 12 is supported can be provided (not shown).

Once the arms 20 are mounted to the instrument panel 12 and to the legs 24, and once the plates 26 are all properly seated on the ground, the compromised instrument case can be dismantled (step 104), leaving the instrument panel 12 untouched and all the electrical interconnections intact.

As described hereinabove, the removal of the old case is similar to the corresponding step from the instrument case replacement method from the prior art. A difference with the corresponding step from the prior art will now be described with reference to FIG. 3.

Indeed, as illustrated in FIG. 3, great care should be taken during removal of the old case so as to not disconnect the wires 14 and 16. For example, to dismantle the old floor 29 a cut is practiced on both side of the protector/isolator tube 31, and the floor 29 is then removed in two parts or more.

Figure 4:
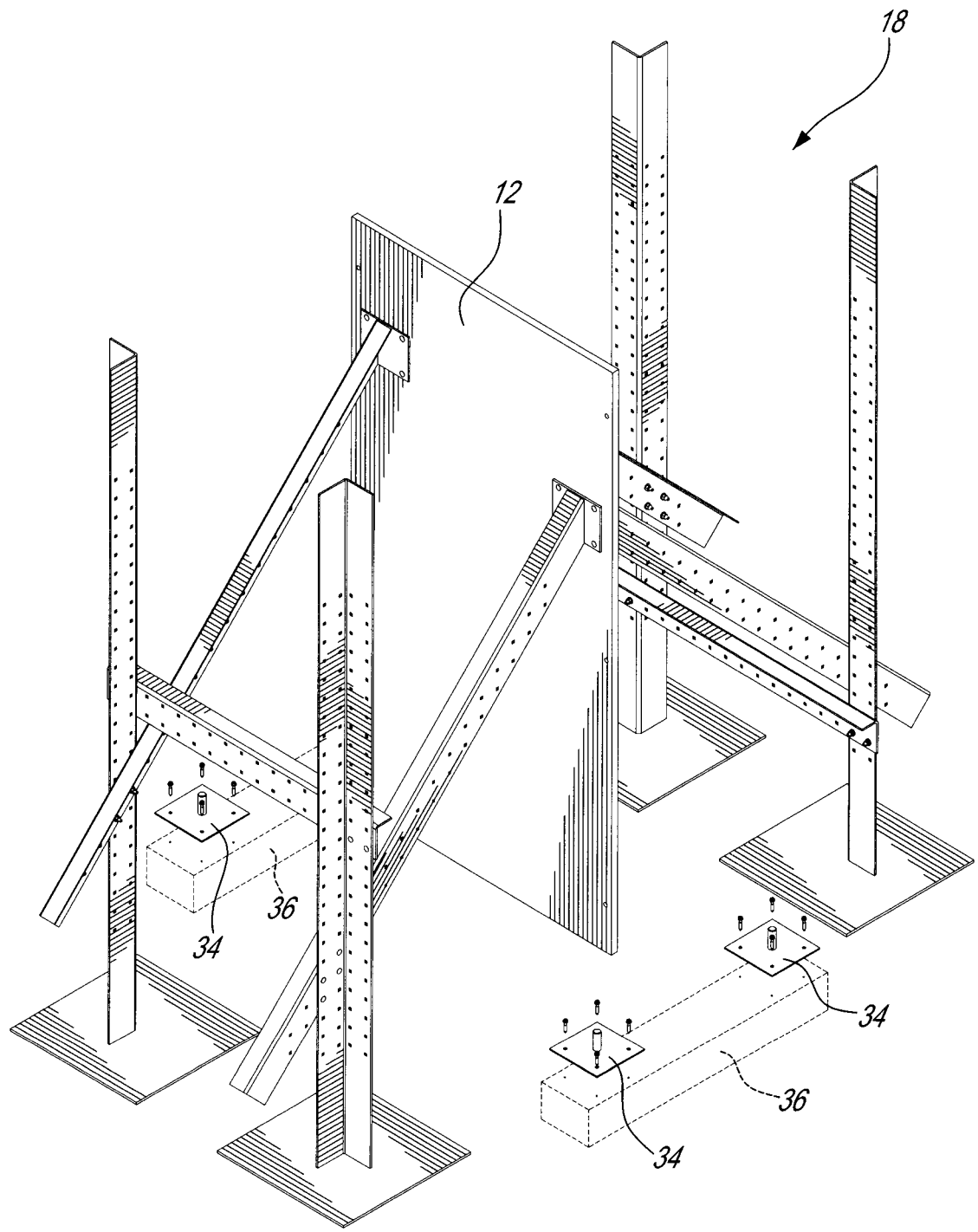
FIG. 4 is a perspective view similar to FIG. 2, showing the temporary holding structure mounted to the electric panel, and replacement anchor plates being mounted to the concrete base.

FIG. 4 illustrates the instrument panel 12 being supported by the temporary holding structure 18.

FIG. 4 also illustrates the beginning of step 106 with the installation of four (4) anchor plates 34 (only three shown) to a base 36 using anchors. The anchor plates 34 are used to fixedly receive the floor 40 assembly of the replacement case 10 onto the base 36. The concrete base 36 is the base that was used for the old case. It is to be noted that the base 36 and anchor plates 34 are not limited to the illustrated embodiments as will be described further. The base 36 can also be replaced by a new base.

Figure 5:
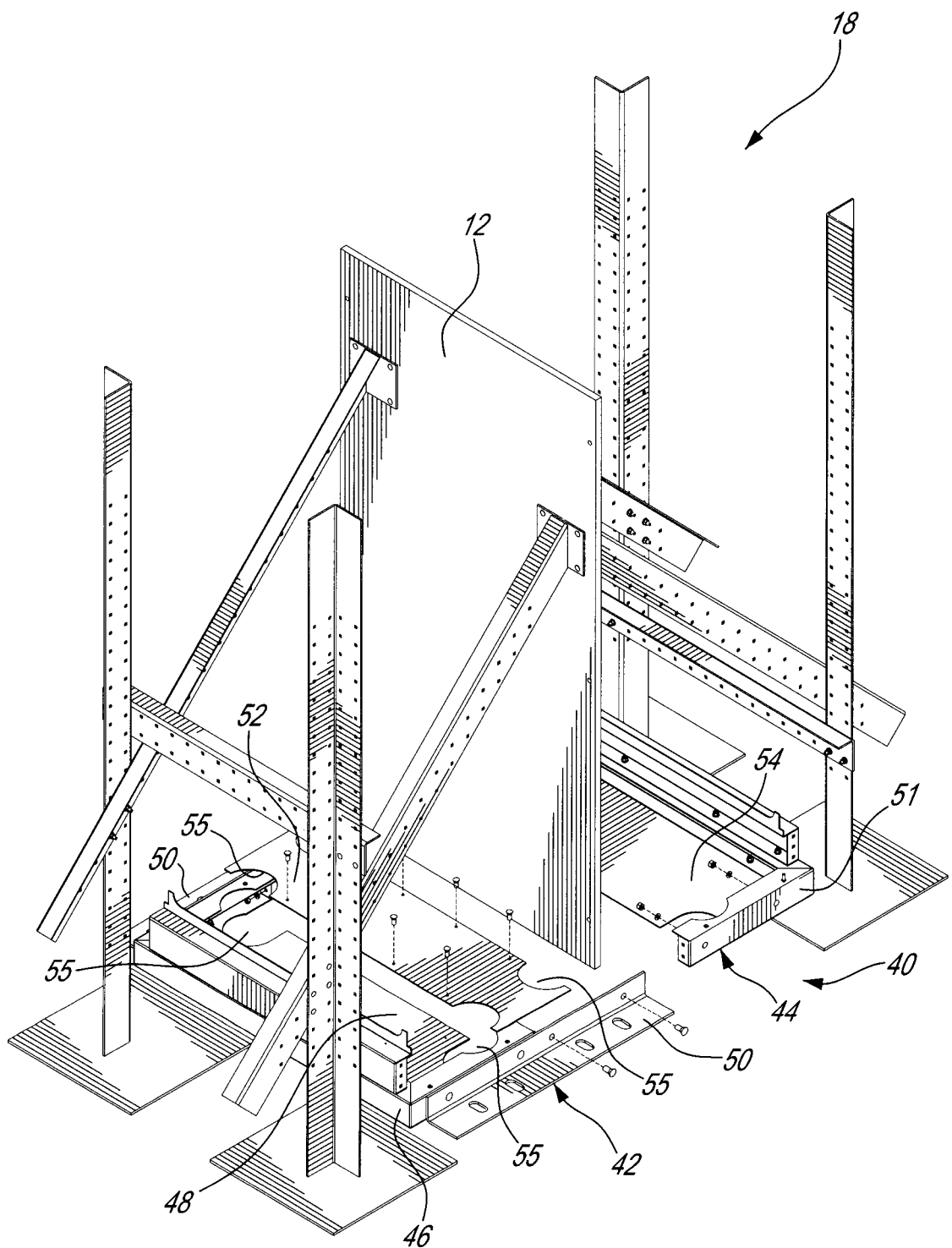
FIG. 5 is a perspective view similar to FIG. 2, showing a replacement two-door instrument case subfloor being installed.

FIG. 5 illustrates the installation of the subfloor assembly 40 of the new instrument case 10. This sub-floor 40 includes a front half portion 42 and a rear half portion 44. The front half 42 includes a U-shaped structure 46, a plate 48 mounted to the structure 46 inside thereof and a pair of brackets 50 secured to the structure 46 outside thereof along a respective one of the two parallel members. Similarly, the rear half 44 includes a U-shaped structure 51 and a plate 54 mounted therein. The bracket 50 and a bottom plate 52 interconnect the front and rear halves 42 and 44. The plates 48, 52 and 54 include half-circle shaped recesses 55.

Figure 6:
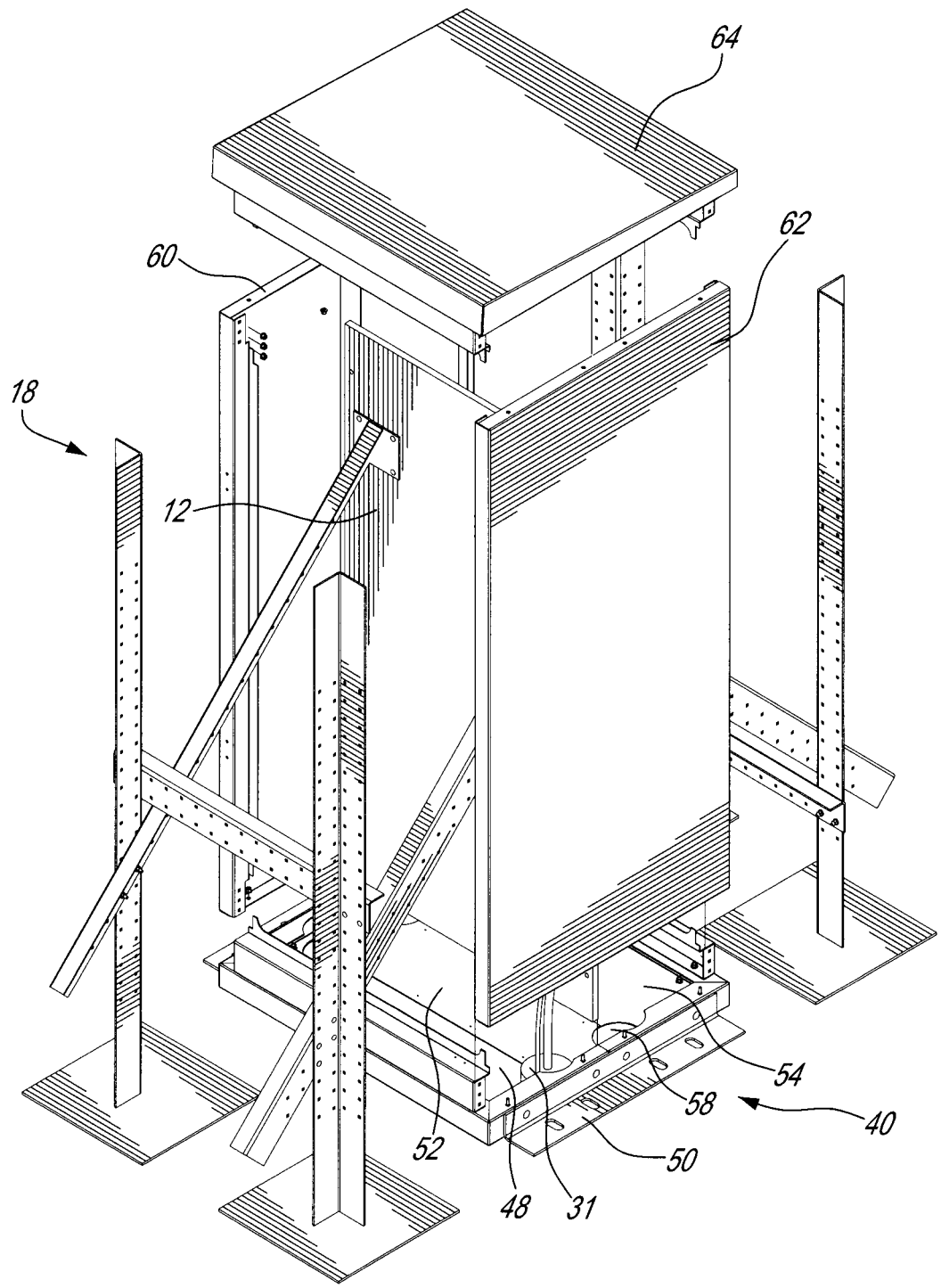
FIG. 6 is a perspective view of a replacement instrument case wall and roof being installed.

FIG. 6 shows the subfloor 40 assembled. The subfloor assembly 40 is achieved by joining the front and rear half 42 and 44 and more specifically by telescopically sliding the parallel members of the U-shaped structure 51 within the parallel members of the U-shaped structure 46. The protecting tube 31 (not shown in FIG. 6) is then moved in the nearest recess 55 and the bottom plate 52 is fixed in place using screws or fasteners (not shown). The recesses 55 of the bottom plate 52 complete the recesses 55 of the front and rear plates 48 and 54 to form circular holes 58, including one that is used to allow passage to the tube 31. Therefore, providing a floor or subfloor assembly in at least two sections, wherein one section includes a recess allows its mounting around the live wires 14 and 16.

Even though the recesses are illustrated herein as being semi-circular, they can have any other shape and size allowing passage for the wires and/or other network link.

The walls 60, 62 and the roof 64 of the replacement case 10 are then mounted to the subfloor 40, as can also be seen on FIG. 6. It is to be noted that once the walls 60, 62 and the roof 64 are securely assembled, the instrument panel 12 can be secured at least to the walls 60 and 62 (step 108). Accordingly, once this is done, the temporary frame support 18 may be removed from the instrument panel 12 (step 110) and stored for a subsequent use.

According to another embodiment, steps 108 and/or 110 are performed after the replacement case 10 is completely mounted. The order of the steps 102 to 110 of the method 100 may then differ then the one presented in FIG. 1.

Figure 7:
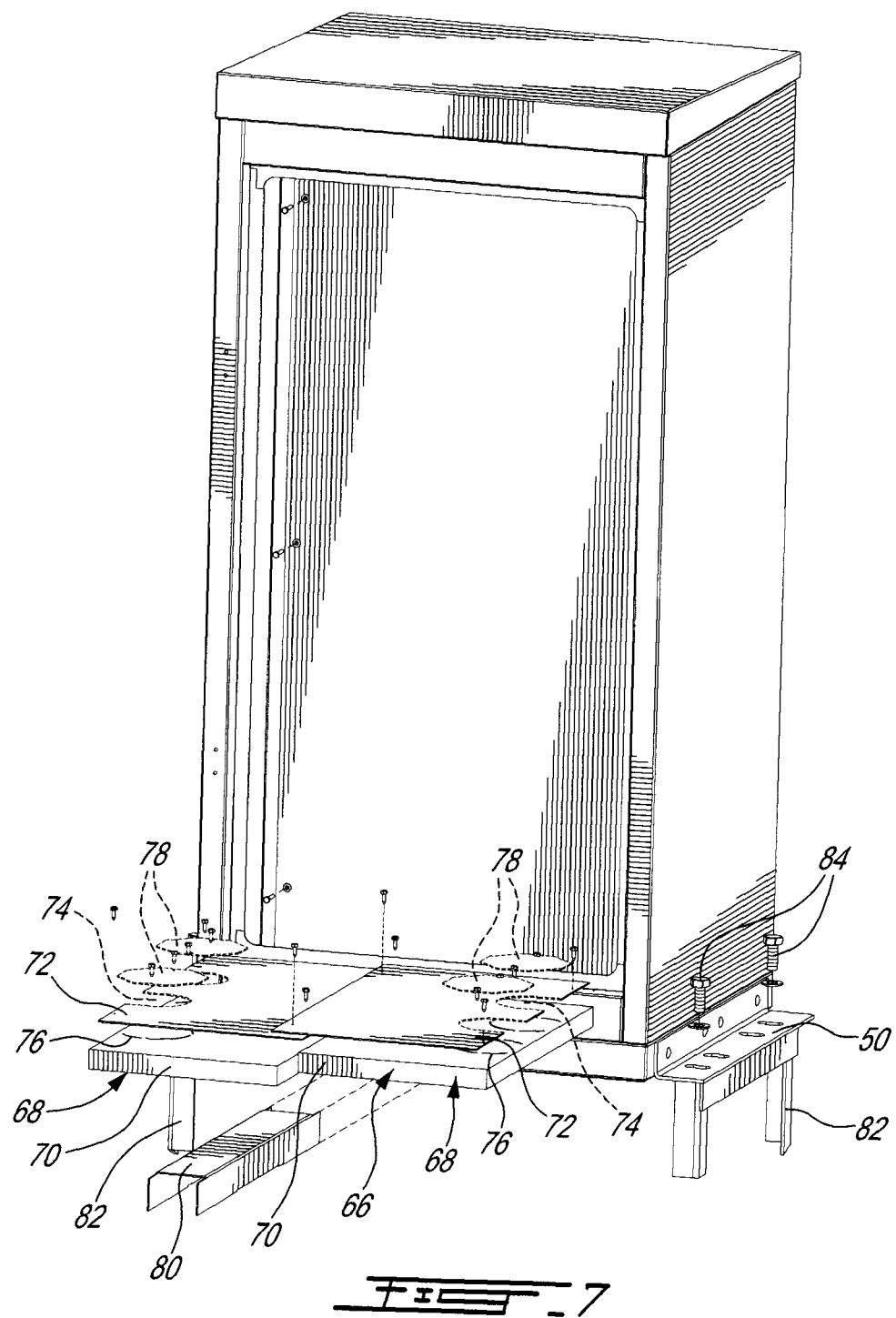
FIG. 7 is a perspective view of a replacement instrument case insulated floor being installed.

FIG. 7 illustrates the installation of the insulated floor assembly 66 on top of the subfloor assembly 40. Similarly to the subfloor 40, the floor 66 is assembled from two half sections 68 to facilitate the installation, considering the presence of wires 14 and 16.

Each section 68 is symmetrically identical and includes an isolator sheet 70 and a base plate 72 secured to the isolator 70 using fasteners or another fastening means such as cement. The plates 72 include recesses 74 positioned so as to be registered with the recesses 55 of the plates 48, 52 and 54 of the subfloor assembly 40. The isolator sheets 70 include either recesses (not shown) or score lines 76 to ease the creation of a recess in the sheet 70 to allow passage for the wires 14 and 16. Cover plates 78 can be mounted to the base plates 72 using for example fasteners to cover the unused recesses 74 and 55.

FIG. 7 also illustrates the securing of the brackets 50 to a further embodiment of a base 82. Similarly to the base 36, the metal frame base 82 can be base used for the old case or a new replacement base install with the new case 10.

FIG. 7 further illustrates the mounting of a base stiffer channel 80 under the floor 66 and secured thereto to reinforce the floor 66, and the securing of the brackets 50 of the subfloor 40 to the base frame 82 through fasteners 84 or other fastening means.

According to other embodiments of a method for replacing an old instrument case with a new instrument case and of a new instrument case used therefore, the plates 48, 52, 54 and 72 and isolator sheets 70 do not include recesses or holes. After taking measurements on site, a worker cut the plates 48 or 54 and 72 and isolator sheet 70 that are on the side of the wires 14 and 16 so as to create a passage for the wires 14 and 16 and tubing 31 or other wire containment (not shown) therethrough.

Figure 8:
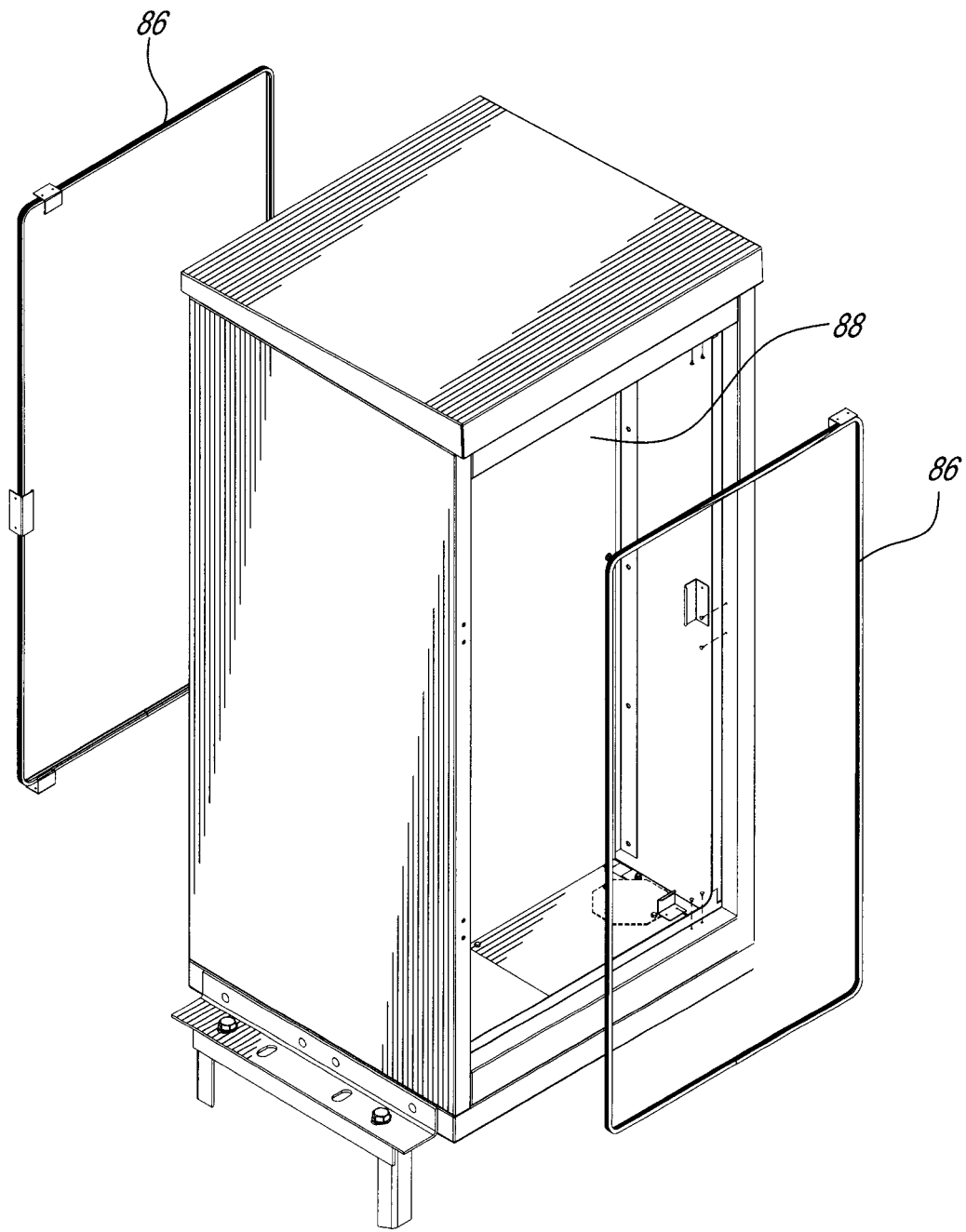
FIG. 8 is a perspective view of a replacement instrument case door gasket being installed.
Figure 9:
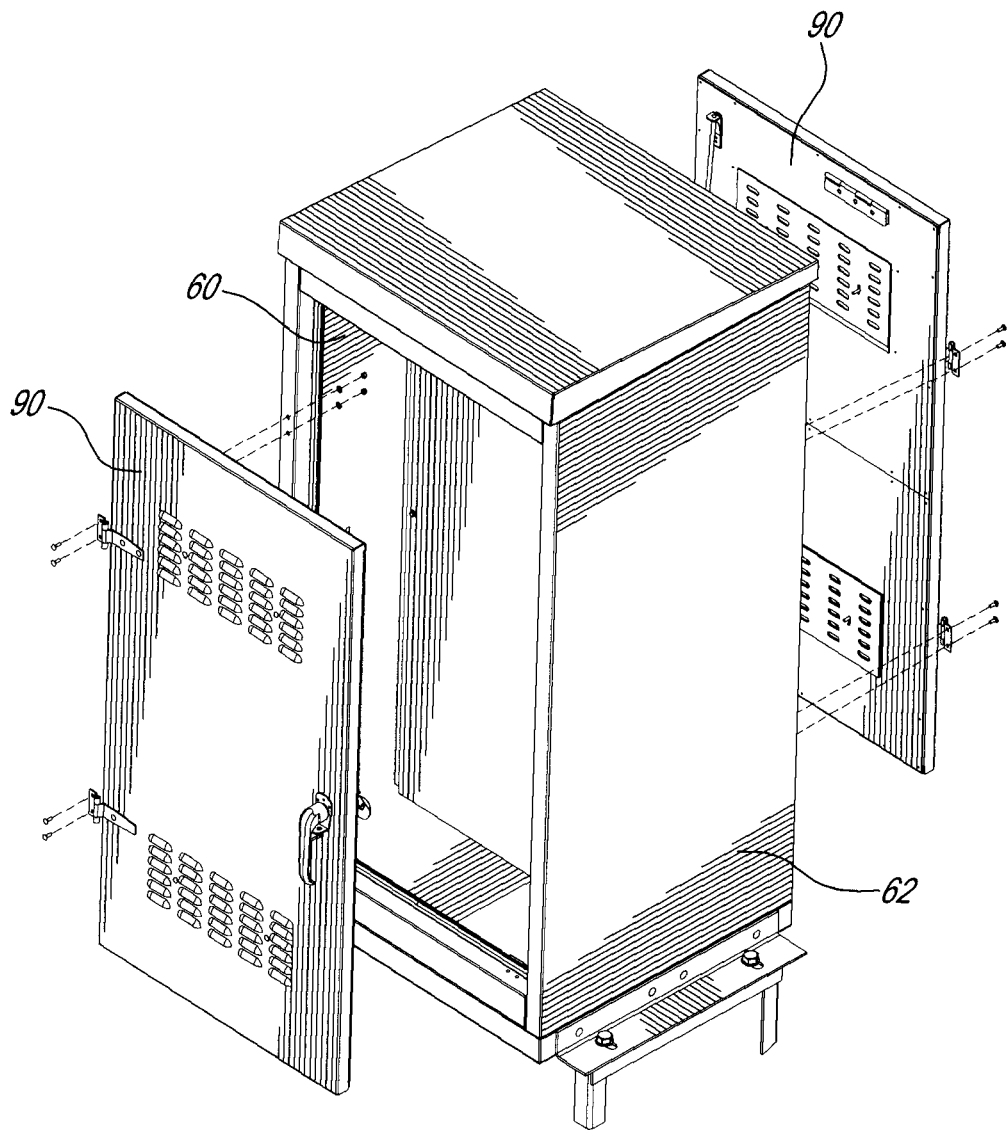
FIG. 9 is a perspective view of a replacement instrument case doors being applied.

In preparation for door installation, a gasket 86 is installed around the edge of both door openings 88 (see FIG. 8). The doors 90 are then hingedly mounted to the walls 60, 62 (see FIG. 9). A replacement case according to an embodiment of the present invention is of course not limited to such an illustrated configuration of door mounting.

Figure 10:
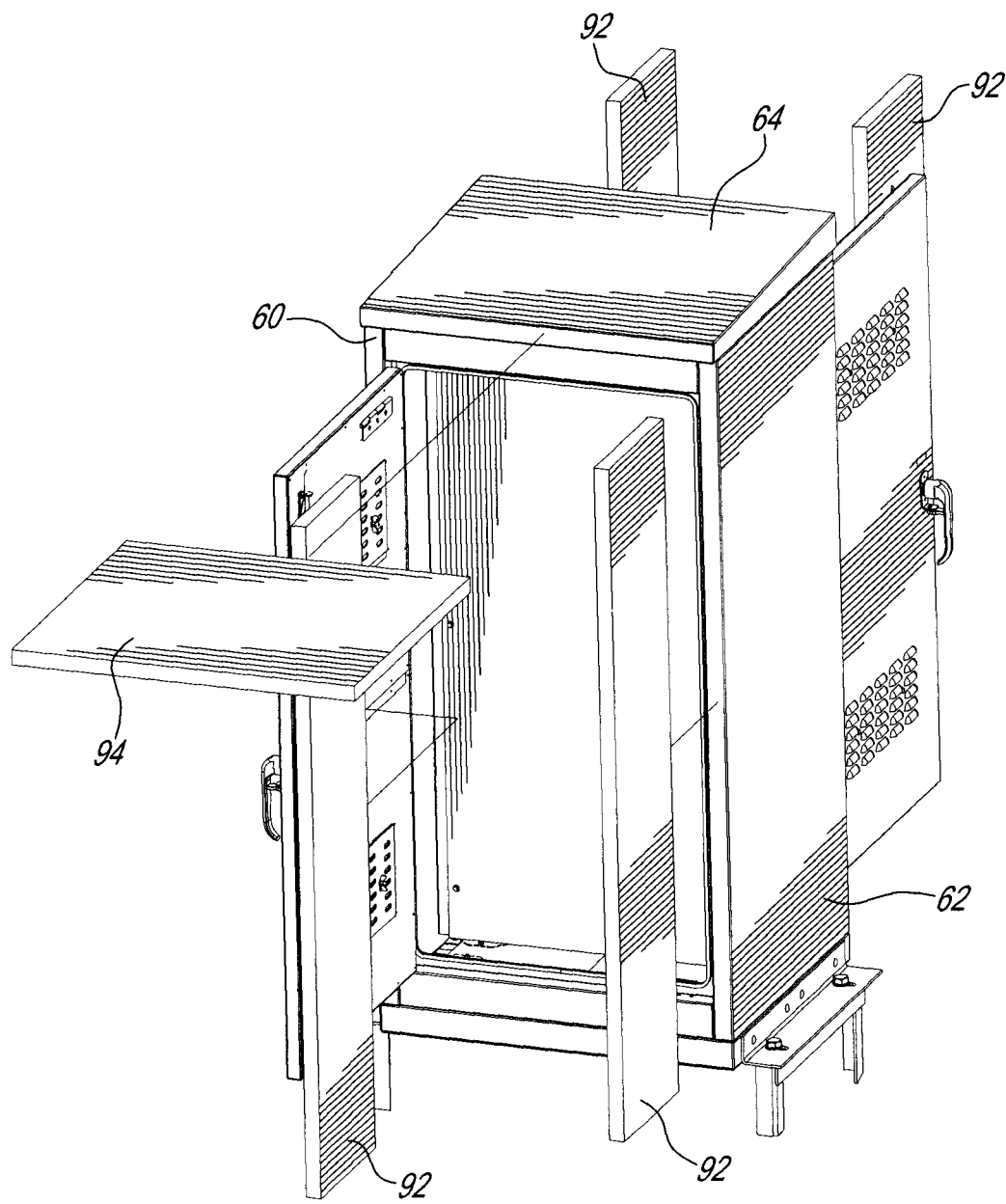
FIG. 10 is a perspective view of a replacement instrument case wall and ceiling insulation being installed.

In FIG. 10, the walls 60 and 62 and the roof 64 are insulated using conventional insulation sheets 92 and 94 cut to the proper sizes. An adhesive (not shown) may be used to mount the insulation sheets 92 and 94 to the walls 60 and 62 and roof 64.

Caulking is then installed (FIG. 11) to all the joints of the new instrument case 10.

Finally, the batteries are repositioned in the new instrument case in their respective places (not shown).

A replacement case according to another embodiment of the present invention does not include insulation and/or caulking.

As will easily be understood by one skilled in the art, the compromised instrument case can be removed and the new instrument case 10 installed using a limited number of general purpose tools such as:

Ratchet set;
Cutting discs;
Gas powered cutting saw;
Grinder with grinding discs;
Sawzall; and
Drill and drill bits.

It has been found that by using the above described method and kit of parts, it is possible to drastically reduce the number of man-hours required to replace a compromised instrument case with a new case compared to the method from the prior art. For example, it has been found that a SS-5 cabinet can be replaced by a crew of three (3) people in four (4) hours. Furthermore, during the present instrument case replacement, there is no downtime, no equipment disconnected, no service interruption and no retesting necessary.

By replacing all the existing contaminated metal cases with an all new aluminum base, frame, walls, doors and roof, maintenance costs are reduced since no painting and patching/plastering has to be done.

According to embodiments of the present invention, the replacement cabinet is manufactured in marine quality aluminum 5052-H32 corrosive resistant. Of course, other adequate materials could be used.

All the parts required can be supplied as a kit including the temporary holding structure, all necessary parts and hardware, in a cardboard box and further including step by step instructions of how to dismantle the old case and assemble the replacement case.

Moreover, the cardboard box may then be used to store all the parts of the old case.

As mentioned hereinabove, the method for replacing an old instrument case with a new instrument case is not limited to the illustrated two door case 10.

Figure 12:
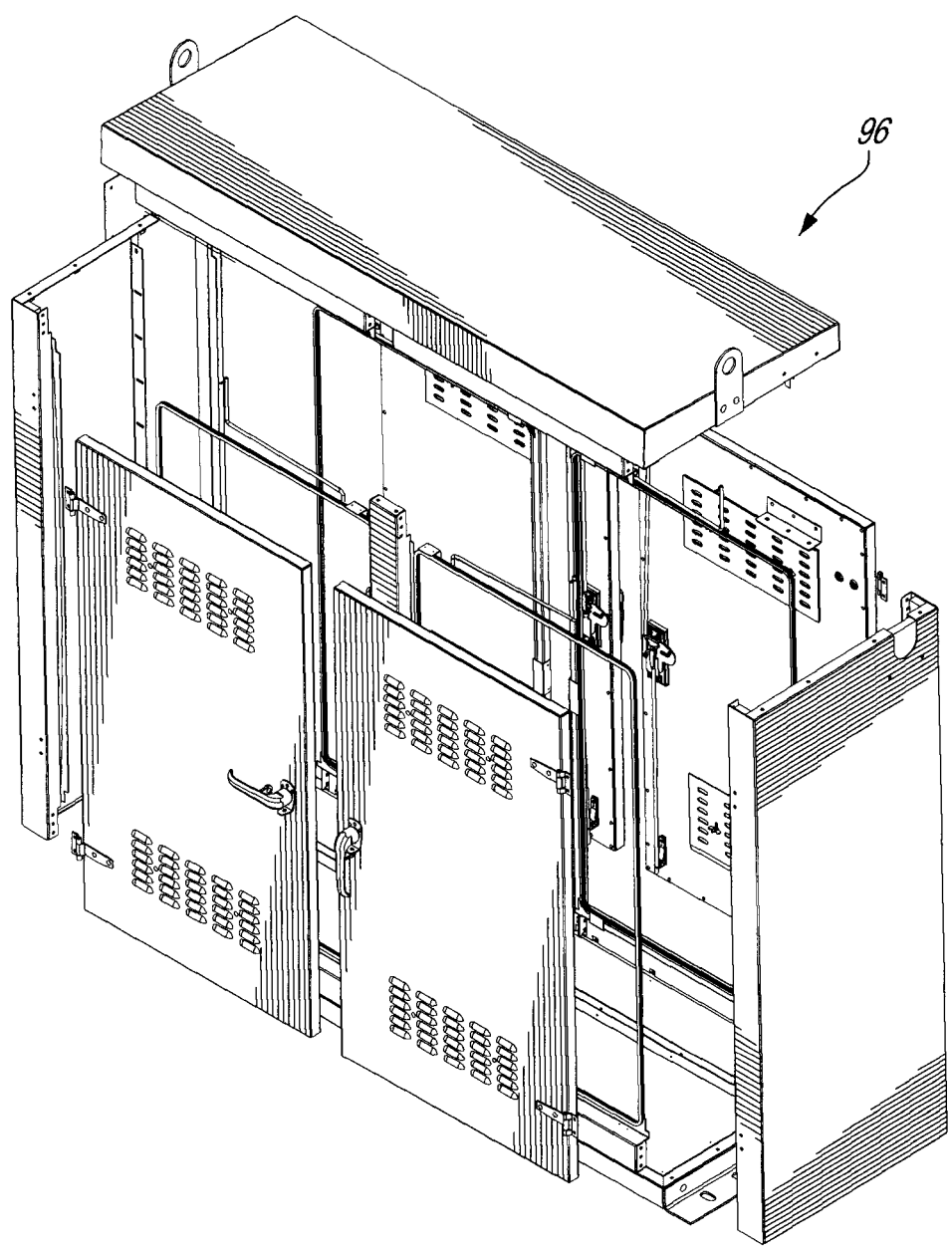
FIG. 12 is an exploded view of a four-door replacement instrument case according to a second embodiment of the present invention.
Figure 13:
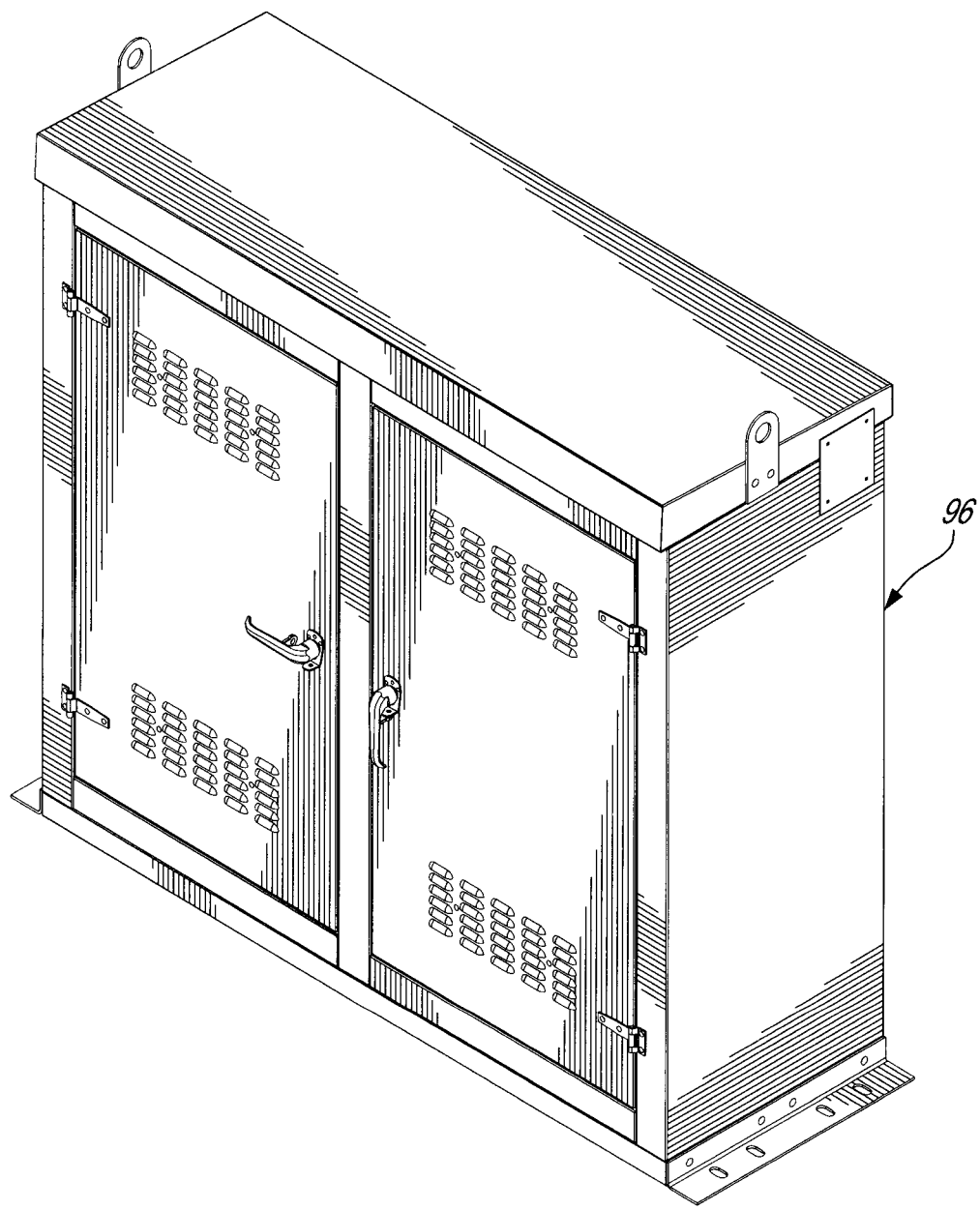
FIG. 13 is a perspective view of the four-door replacement case from FIG. 12.

Another example of a case than can be installed using the present method is shown in FIGS. 12 and 13. The case 96 includes four (4) doors, two on each side. Returning briefly to FIG. 2, a pair of side by side temporary support frames 18 can be used to support the two instrument panels (not shown) during the removal of the old case.

Figure 14:
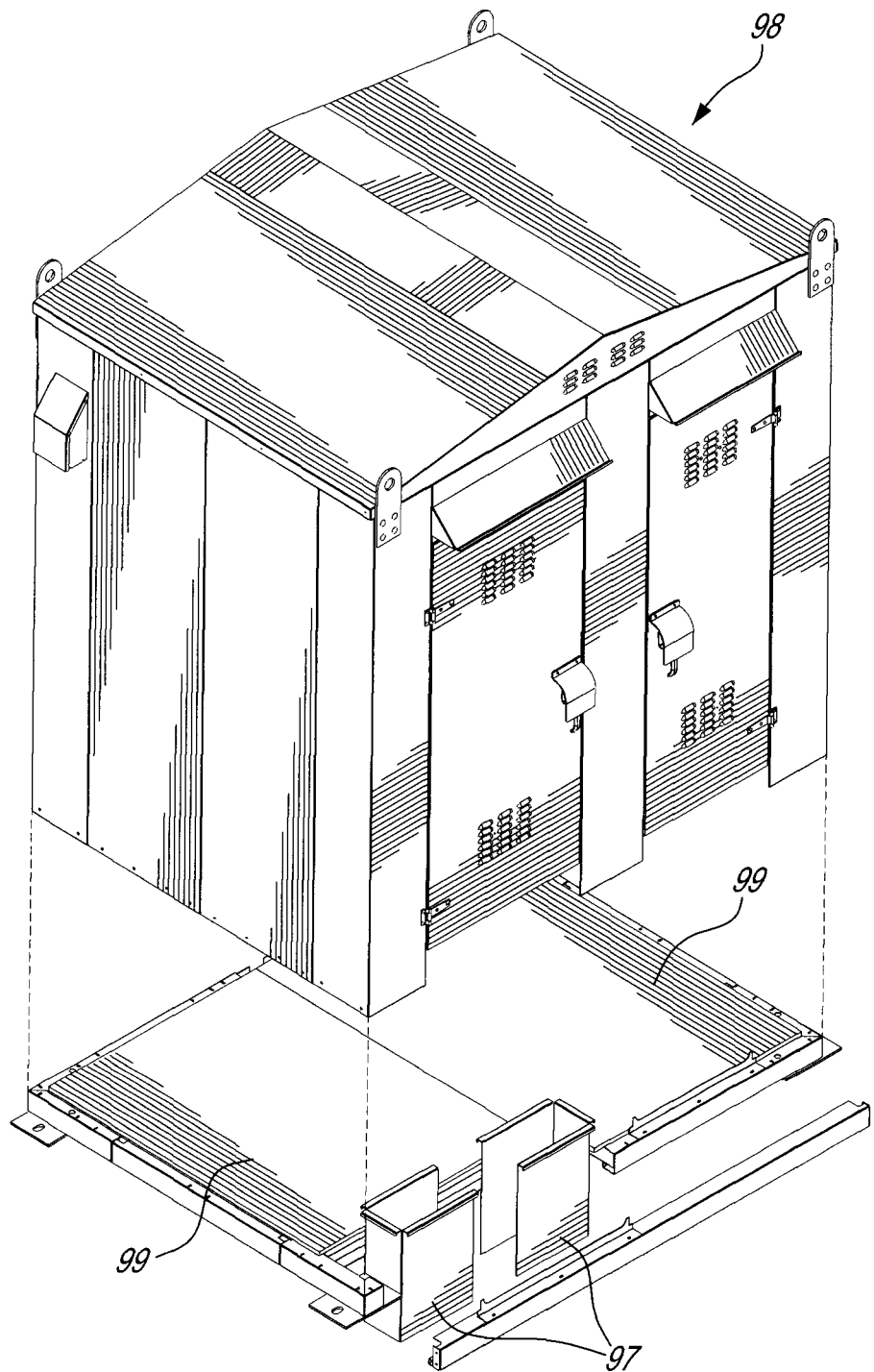
FIG. 14 is a perspective view of a replacement bungalow according to a third embodiment of the present invention.

FIG. 14 shows a new bungalow 98 that can also be used to replace an old case (not shown). It is to be noted the two portions 99 of the floor to help position the wiring as described hereinabove. FIG. 14 further illustrates the use of a two-part rectangular sleeve 97 to define a passage for the wiring through the floor. Since the method for replacing the old case with the new bungalow is similar to what has been described hereinabove using the case 10 as an example, it will not be described further in more detail.

While the replacement cases described herein are all fully assembled on site, a replacement case according to another embodiment of the present invention (not shown) can be partly assembled prior to arrival on site and prior to step 104 of the method 100. The floor of the replacement case is however assembled on site after the old case is dismantled.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, the present invention has been described hereinabove by way of illustrative embodiments thereof; it can be modified, without departing from the spirit, scope and nature of the subject invention.

The invention claimed is:

1. A method for replacing an old railroad instrument case along a railroad track with a new railroad instrument case, the old railroad instrument case including at least one instrument panel connected from outside the old railroad instrument case through wiring passing through a hole in an old floor of said old railroad instrument case, the old railroad instrument case primarily used to control rail traffic and crossing gates through one or more networks that is connected through the wiring, the method comprising:
    supporting each of the least one instrument panel;
    removing the old railroad instrument case, including cutting and dismantling the old floor of the old railroad instrument case around the wiring;
    installing the new railroad instrument case, said installing comprising:
        providing a new floor comprising two floor sections;
        taking measurements on site and cutting a recess according to said measurements in at least one of the two floor sections so as to form a passage for the wiring;
        installing the new floor such that the wiring is encompassed within the recess; and
        installing a remainder of the new railroad instrument case and securing each of the at least one instrument panel thereto;
    removing support from each of the at least one instrument panel;
    wherein said method is performed while the railroad track remains in operation and without disconnecting any electric equipment on the at least one instrument panel.

2. A method as recited in claim 1, wherein said supporting each of the least one instrument panel includes removably mounting a temporary holding structure to each of the at least one instrument panel, and said removing support from each of the at least one instrument panel includes removing the temporary holding structure from each of the at least one instrument panel.

3. A method such as recited in claim 1, wherein the recess comprises a recessed portion in each of the floor sections, said recessed portion being aligned upon installation to define a passage for said wiring.

* * * * *